(12) United States Patent
Liang et al.

(10) Patent No.: US 9,382,441 B2
(45) Date of Patent: Jul. 5, 2016

(54) HYDROPHOBIC AND OLEOPHOBIC COATING COMPOSITION

(71) Applicant: 3M INNOVATIVE PROPERTIES COMPANY, St. Paul, MN (US)

(72) Inventors: Xinyu Liang, Shanghai (CN); Lifei Hao, Shanghai (CN); Yu Yang, Eden Prairie, MN (US); Minhao Song, Shanghai (CN); KeFeng Xia, Shanghai (CN)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/411,199

(22) PCT Filed: Jun. 27, 2013

(86) PCT No.: PCT/IB2013/003262
§ 371 (c)(1),
(2) Date: Dec. 24, 2014

(87) PCT Pub. No.: WO2014/004840
PCT Pub. Date: Jan. 3, 2014

(65) Prior Publication Data
US 2015/0141563 A1    May 21, 2015

(51) Int. Cl.
*C09D 133/02*    (2006.01)
*C03C 17/30*    (2006.01)
(Continued)

(52) U.S. Cl.
CPC ............. *C09D 133/02* (2013.01); *C03C 17/30* (2013.01); *C08K 3/16* (2013.01); *C08K 5/09* (2013.01);
(Continued)

(58) Field of Classification Search
None
See application file for complete search history.

(56) References Cited

U.S. PATENT DOCUMENTS 5,250,322 A  * 10/1993  Takahashi ............. C03C 17/009
                                                106/2
5,800,926 A  *  9/1998  Nogami .................. C03C 17/42
                                                427/168
(Continued)

FOREIGN PATENT DOCUMENTS

EP    0497189    8/1992
EP    0816452    1/1998
(Continued)

OTHER PUBLICATIONS

"Carboset® Acrylic Polymers," Performance Coatings, Lubrizol Corporation, [online] 1995-2013, [retrieved from internet on Jun. 12, 2013], URL <http://www.lubrizol.com/Coatings/Carboset/default.html>, 1 page.

(Continued)

*Primary Examiner* — Robert S Loewe
(74) *Attorney, Agent, or Firm* — Aleksander Medved (57) ABSTRACT

The present disclosure provides a hydrophobic and oleophobic coating composition, which comprises the following components based on weight percentage: 0.1-15% of a fluorosiloxane, 1-30% of a polyacrylic resin, 0.1-15% of a silane coupler, 33-98% of an organic solvent, and 0.05-15% of an acid. By combining the polyacrylic resin and the fluorosiloxane which exhibits hydrophobic property, the present composition not only provides good hydrophobic property but also ensures durable hydrophobic property of the coating with the help of good adhesion of polyacrylic resin. The coating composition can form hard coating which has high glossiness and high transparency under relatively low temperatures and has a contact angle of 115-120°. This coating composition can be used on surfaces of substrates, such as automotive paints, metal, plastic and glass, and it can retain long lasting hydrophobic and oleophobic property even placed outdoors for several months, and it can also prevent the surface of the substrate from being scratched.

15 Claims, 4 Drawing Sheets

(51) Int. Cl.
  *C09D 133/08* (2006.01)
  *C09D 183/08* (2006.01)
  *C08K 3/16* (2006.01)
  *C08K 5/09* (2006.01)
  *C08K 5/092* (2006.01)
  *C08G 77/24* (2006.01)

(52) U.S. Cl.
  CPC .............. C08K 5/092 (2013.01); C09D 133/08 (2013.01); C09D 183/08 (2013.01); *C03C 2217/76* (2013.01); *C08G 77/24* (2013.01)

(56) References Cited

U.S. PATENT DOCUMENTS

| | | | | |
|---|---|---|---|---|
| 5,922,787 A * | 7/1999 | Kondo | ................ | C08G 65/007 106/18.35 |
| 6,361,871 B1 * | 3/2002 | Jenkner | .................... | C09D 4/00 427/387 |
| 6,491,838 B1 * | 12/2002 | Standke | ................ | C04B 41/009 406/18.32 |
| 6,511,721 B1 * | 1/2003 | Murata | ................... | G02B 1/105 428/1.3 |
| 8,329,305 B2 * | 12/2012 | Motoyama | ............. | C08G 77/08 427/168 |
| 8,940,389 B2 | 1/2015 | Bergandt | | |
| 2004/0191481 A1 * | 9/2004 | Erb | ........................ | G02B 5/128 428/143 |
| 2005/0038150 A1 * | 2/2005 | Meiners | ................ | C07F 7/1836 524/263 |
| 2005/0137289 A1 * | 6/2005 | Hooftman | ............... | C08L 83/04 523/218 |
| 2006/0128831 A1 * | 6/2006 | Cook | .................... | C09J 133/04 523/160 |
| 2007/0048348 A1 * | 3/2007 | Atanasoska | ............. | A61L 29/08 424/423 |
| 2007/0207307 A1 * | 9/2007 | Yoneyama | ........... | G02B 5/3058 428/313.5 |
| 2008/0156224 A1 * | 7/2008 | Su | ............................ | B05D 5/08 106/13 |
| 2008/0221263 A1 | 9/2008 | Kanagasabapathy | | |
| 2009/0162631 A1 * | 6/2009 | Bergandt | ................. | C09D 4/00 428/220 |
| 2011/0250422 A1 * | 10/2011 | Kessman | ................... | C08G 77/42 428/220 |
| 2012/0029127 A1 | 2/2012 | Hung | | |
| 2012/0189843 A1 * | 7/2012 | Chang | .................... | C03C 17/30 428/337 |

FOREIGN PATENT DOCUMENTS

| | | |
|---|---|---|
| EP | 1555249 | 7/2005 |
| EP | 2159261 | 3/2010 |

OTHER PUBLICATIONS

International Search Report for PCT International Application No. PCT/2013/048205 mailed on Oct. 24, 2013, 2 pages.

* cited by examiner

HYDROPHOBIC AND OLEOPHOBIC COATING COMPOSITION

CROSS REFERENCE TO RELATED APPLICATIONS

This application is a national stage filing under 35 U.S.C. 371 of PCT/IB2013/003262, filed Jun. 27, 2013, which claims priority to Chinese Application No. 201210229101.7, filed Jun. 29, 2012, the disclosures of which are incorporated by reference in their entireties herein.

TECHNICAL FIELD

The disclosure relates to a coating composition, especially a hydrophobic and oleophobic coating composition.

BACKGROUND ART

According to one recent survey of car owners, 64% of respondents thought that the hazy sight in rainy days was the most serious pain. In addition, car is always under harsh conditions and it will be subjected to scratches, stone-chips from flying debris, bugs, acid rain which will attack the car paint with its chemical reactions. This pain damage will devalue the vehicle, affect its beauty and cause the expensive repairs. Similarly, some other fields, for example, building and furniture, are also faced with these issues.

Hydrophobic/oleophobic coating is commonly supposed to be the best way of precautions against above issues. The some of the existing hydrophobic/oleophobic coating technologies still remain unsolved problems, like high curing temperature, such as around 150° C., complex process and makes it difficult to be used in the automobile repairing centers. In addition, some of coatings have poor durable hydrophobicity.

Therefore, there is still a need to provide a hydrophobic and oleophobic coating composition with long lasting hydrophobic property and simple process.

SUMMARY OF THE DISCLOSURE

The object of the disclosure is to provide a hydrophobic/oleophobic coating composition with long lasting hydrophobicity by taking following approaches to deal with the above problems mentioned in the background art.

To achieve the above object, the coating composition according to the present disclosure comprises the following components by weight of: 0.1-15% fluorosiloxane, 1-30% polyacrylic resin, 0.1-15% silane coupler, 33-98% organic solvent, and 0.05-15% acid.

According to certain embodiments, the fluorosiloxane is that represented by the formula (I):

$$CF_3(CF_2)_a(CH_2)_b-Si(OCH_2CH_3)_3 \quad (I)$$

Wherein, a is 3-10, and b is 1-7.

According to certain embodiments, the fluorosilane is perfluoro polyether siloxane.

According to certain embodiments, the fluorosiloxane is perfluoro polyether siloxane represented by formula (II):

$$(C_2H_5O)_3Si(CH_2)_3N(H(C(O)-R_f-C(O)N(H)(CH_2)_3 \\ Si(OC_2H_5)_3 \quad (II)$$

wherein $R_f$ is $CF_2O(CF_2CF_2O)_n(CF_2O)_mCF_2$, n and m are independently 1-20. More preferably, n and m are independently 9 and 10.

According to certain embodiments, the silane coupler is at least one selected from the group consisting of the following compounds:

According to certain embodiments, the silane coupler is:

According to certain embodiments, the polyacrylic resin is in the form of hydroxy modified polyacrylic resin emulsion.

According to certain embodiments, the organic solvent is selected from $C_{2-3}$ alcohols, $C_{2-3}$ ketones or $C_{2-3}$ esters.

According to certain embodiments, the organic solvent is ethanol or isopropanol.

According to certain embodiments, the organic solvent is acetone or methyl ethyl ketone.

According to certain embodiments, the acid is one or more selected from the group consisting of hydrochloric acid, sulfuric acid, acetic acid, citric acid and lactic acid.

Another object of the present disclosure is to provide a method to prepare the above coating composition. The method comprises the following steps:

mixing the organic solvent, the polyacrylic resin, the silane coupler and the fluorosiloxane to yield a clear mixture;

adding acid into the mixture, and stirring it until the mixture is clear;

allowing the mixture to stand for aging.

According to certain embodiments, in the above preparation method, after adding acid into the mixture, the mixture is stirred for 1-3 hrs.

According to certain embodiments, in the above preparation method, after stirring, the mixture is allowed to stand for aging for at least 1 day.

According to certain embodiments, the method for preparing the above coating composition, comprises: mixing the fluorosiloxane and acid to obtain a first component, and mixing the organic solvent, the polyacrylic resin and the silane coupler to obtain a second component, and then mixing the first component and the second component, followed by stirring and aging until it is clear.

Yet another object of the present disclosure is to provide a use of the above coating composition on surfaces of substrates, such as automotive paints, metals, plastics and glass.

The hydrophobic and oleophobic coating according to the present disclosure uses fluorosiloxane, polyacrylic resin, silicone coupler, organic solvent, and acid catalyst. The combination the polyacrylic resin and fluorosiloxane which performances hydrophobicity, not only providing good hydrophobic property, but also ensuring long lasting hydrophobicity of the coating with the help of good bonding of polyacrylic resin. In particular, using perfluoro polyether siloxane, the coating composition can form hard coating with high glossiness and high transparency under relatively low temperatures, having a contact angle of 115-120°. This coating composition can be used on surfaces of substrates, such as automotive paints, metals, plastics and glass, and it can retain long lasting hydrophobic and oleophobic property even placed outdoors for several months, and it can also prevent the surface of the substrate from being scratched.

DETAILED DESCRIPTION OF THE EMBODIMENT

The coating composition is illustrated by referring to some specific examples below. In the context, unless otherwise indicated, the units of all contents are weight percentage.

According to the present disclosure, the hydrophobic and oleophobic coating composition comprises the following components by weight percentage: 0.1-15% perfluoro polyether siloxane, 1-30% polyacrylic resin, 0.1-15% silane coupler, 33-98% organic solvent, and 0.05-15% acid.

The hydrophobic and oleophobic coating according to the present disclosure uses perfluoro polyether siloxane, polyacrylic resin, silane coupler, organic solvent, and acid catalyst. The combination of the polyacrylic resin and perfluoro polyether siloxane which performances hydrophobic property, not only providing good hydrophobicity, but also ensuring long lasting hydrophobicity of the coating with the help of good bonding of polyacrylic resin with perfluoro polyether siloxane. This coating composition can form hard coating with high glossiness and high transparency under relatively low temperatures, having a contact angle of 115-120°.

The perfluoro polyether siloxane used in the coating composition exhibits hydrophobic property, and can form transparent coating under low temperatures. In the coating composition, the amount of perfluoro polyether siloxane is 0.1-15%, if the amount is less than 0.1%, the transparency is not desired, and if the amount is above 15%, the hydrophobic property is affected.

According to a certain embodiment, the perfluoro polyether siloxane used is perfluoro polyether siloxane represented by formula (II)

(II)

wherein, $R_f$ is $CF_2O(CF_2CF_2O)_n(CF_2O)_mCF_2$, n and m are independently 1-20.

According to a further embodiment, the perfluoro polyether siloxane is perfluoro polyether siloxane represented by formula (II)

(II)

wherein, $R_f$ is $CF_2O(CF_2CF_2O)_n(CF_2O)_mCF_2$, n and m are independently 9 and 10, and the molecular weight is around 2400.

The polyacrylic resin used in the coating composition has very good adhesion and glossiness, and promotes adhesion of the coating on the substrate through chemically bonding with perfluoro polyether siloxane, and thus improves the durable hydrophobicity. Meanwhile, it effectively reduces the disadvantage of losing hydrophobic property under UV light for perfluoro polyether siloxane. In the coating composition according to the present disclosure, the amount of polyacrylic resin is 1-30%. If the amount of polyacrylic resin is below 1%, the durable hydrophobicity of the coating is not desired, and if the amount is above 30%, the hydrophobic property is reduced.

The silicone coupler used in the coating composition can apparently improves the compatibility of polyacrylic resin with perfluoro polyether siloxane, in order to eventually achieve fully transparent coating. In the coating composition, the amount of silicone coupler is 0.1-15%. If the amount is below 0.1%, the transparency of the coating composition is not desired, and if the amount is above 15%, the hydrophobic property of the coating is reduced.

According to certain embodiments, the silane coupler is at least one selected from the group consisting of the following compounds:

$CH_2$=$C(CH_3)COOC_3H_6Si(OCH_3)$.

According to a further embodiment, the silane coupler is:

The organic solvent used in the coating composition imparts the coating composition good leveling property. In the coating composition, the amount of organic solvent is 33-98%, if the amount is below 33%, the leveling property is not desired, affecting the appearance and transparency of the coating, and if the amount is above 98%, it results in sagging in the applying process.

According to certain embodiments the organic solvent is $C_{2-3}$ alcohol, $C_{2-3}$ ketone or $C_{2-3}$ ester.

According to a further embodiment, the organic solvent is ethanol or isopropanol, acetone or methyl ethyl ketone. According to an even further embodiment, the organic solvent is ethanol. The acid used in the coating composition primarily acts as catalyst for the hydrolysis of perfluoro polyether siloxane and silane coupler. In the coating composition, the amount of acid is 0.05-15%. If the amount is below 0.05%, the catalytic effect is not obvious, affecting the transparency of the coating, and if the amount is above 15%, the hydrophobic property is reduced.

According to certain embodiments, the acid used is one or more of the following acids: hydrochloric acid, sulfuric acid, acetic acid, citric acid and lactic acid. According to a further embodiment, the acid is hydrochloric acid.

The above coating composition can be prepared through the following method:

mixing the organic solvent, the polyacrylic resin, the silane coupler and the perfluoro polyether siloxane to yield a clear mixture;

adding acid into the mixture, and stirring it until the mixture is clear;

allowing the mixture to stand for aging, until it is completely clear.

The coating composition can be prepared through the following method:

mixing the perfluoro polyether siloxane and acid as a first component, and mixing the organic solvent, the polyacrylic resin and the silane coupler as a second component, and then mixing the first component and the second component, followed by stirring and aging until it is completely clear.

EXAMPLES

Table 1 shows the starting materials used in the following examples.

TABLE 1

| Starting materials | Chemical name | Manufacturer |
|---|---|---|
| ECC4000 | Perfluoro polyether siloxane | 3M |
| F8261 | Fluorosiloxane | Evonik |
| KH560 | γ-(2,3-Epoxypropoxy) propyltrimethoxysilane | Sinopharm |
| KH550 | γ-Aminopropyl triethoxysilane | Sinopharm |
| KH570 | γ- (Methacryloyloxy) propyltrimethoxysilane | Sinopharm |
| Carboset ®GA1594[CST1594] | Hydroxy modified polyacrylic acid resin emulsion | Lubrizol |
| HCl | HCl | Conventional |
| Sulfuric acid | Sulfuric acid | Conventional |
| Citric acid | Citric acid | Conventional |
| Acetic acid | Acetic acid | Conventional |

ECC4000 represents perfluoro polyether siloxane represented by the formula (II) wherein n and m are respectively 9-10.

F8261 represents fluorosiloxane represented by the formula (I) wherein a is 3-10 and b is 1-7.

Table 2 is the composition of some examples of the coating composition.

TABLE 2

The composition of the examples, wt %

| No. | Ethanol | Polyacrylic acid resin | KH560 | ECC4000 | HCl |
|---|---|---|---|---|---|
| 1-a | 97.85 | 1 | 1 | 0.1 | 0.05 |
| 1-b | 77.6 | 14 | 7 | 0.7 | 0.7 |
| 1-c | 68.6 | 30 | 1 | 0.2 | 0.2 |
| 1-d | 54.6 | 14 | 30 | 0.7 | 0.7 |
| 1-e | 33 | 30 | 7 | 15 | 7 |
| 2 | Ethanol | Carboset | KH560 | ECC4000 | $H_2SO_4$ |
|   | (33%-98%) | (1%-30%) | (1%-30%) | (0.1%-15%) | (0.05%-7%) |
| 3 | Ethanol | Carboset | KH560 | ECC4000 | Acetic acid |
|   | (33%-98%) | (1%-30%) | (1%-30%) | (0.1%-15%) | (0.1%-15%) |
| 4 | Ethanol | Carboset | KH560 | ECC4000 | Citric acid |
|   | (33%-98%) | (1%-30%) | (1%-30%) | (0.1%-15%) | (0.01%-2%) |
| 5 | Isopropanol | Carboset | KH560 | ECC4000 | HCl |
|   | (33%-98%) | (1%-30%) | (1%-30%) | (0.1%-15%) | (0.05%-7%) |
| 6 | Acetone | Carboset | KH560 | ECC4000 | HCl |
|   | (33%-98%) | (1%-30%) | (1%-30%) | (0.1%-15%) | (0.05%-7%) |
| 7 | Ethanol | Carboset | KH550 | ECC4000 | HCl |
|   | (33%-98%) | (1%-30%) | (1%-30%) | (0.1%-15%) | (0.05%-7%) |
| 8 | Ethanol | Carboset | KH570 | ECC4000 | HCl |
|   | (33%-98%) | (1%-30%) | (1%-30%) | (0.1%-15%) | (0.05%-7%) |
| 9 | Ethanol | Carboset | KH560 | F8261 | HCl |
|   | (33%-98%) | (1%-30%) | (1%-30%) | (0.1%-5%) | (0.05%-7%) |
| 10 | Ethanol | Carboset | KH560 | ECC4000 | HCl |
|   | (33%-98%) | (0%) | (1%-30%) | (0.1%-15%) | (0.05%-7%) |
| 11 | Ethanol | Carboset | KH560 | ECC4000 | HCl |
|   | (33%-98%) | (1%-30%) | (0%) | (0.1%-15%) | (0.05%-7%) |

Carboset: the hydroxy modified polyacrylic resin emulsion provided by Lubrizol under Carboset ®GA1594[CST1594].

No. 10 and 11 are comparative examples, No. 10 is the case without polyacrylic resin, and No. 11 is the case without silane coupler.

If polyacrylic resin is not added, durable hydrophobic property and abrasion resistance cannot be assured; if the amount of silane coupler is not sufficient or without addition, the transparency of the film would be greatly reduced.

TABLE 3

Test results of the example coatings

| | Appearance | Leveling property | Transparency | Contact angle | Oleophobic property | Long lasting hyderophobic property | Antifouling property | Abrasion resistance |
|---|---|---|---|---|---|---|---|---|
| 1-a | ○ | ○ | ○ | Δ | Δ | ○ | Δ | ○ |
| 1-b | ○ | ○ | ○ | ○ | ○ | ○ | ○ | ○ |

TABLE 3-continued

Test results of the example coatings

| | Appearance | Leveling property | Transparency | Contact angle | Oleophobic property | Long lasting hyderophobic property | Antifouling property | Abrasion resistance |
|---|---|---|---|---|---|---|---|---|
| 1-c | ○ | ○ | Δ | ○ | ○ | ○ | ○ | ○ |
| 1-d | ○ | ○ | ○ | Δ | Δ | ○ | ○ | ○ |
| 1-e | ○ | ○ | ○ | ○ | ○ | ○ | ○ | ○ |
| 2 | ○ | ○ | ○ | ○ | Δ | ○ | ○ | ○ |
| 3 | ○ | ○ | ○ | ○ | Δ | ○ | ○ | ○ |
| 4 | ○ | ○ | ○ | ○ | Δ | ○ | ○ | ○ |
| 5 | ○ | Δ | ○ | ○ | ○ | ○ | ○ | ○ |
| 6 | ○ | ○ | ○ | ○ | ○ | ○ | ○ | ○ |
| 7 | x | ○ | x | ○ | ○ | ○ | ○ | ○ |
| 8 | x | ○ | x | ○ | ○ | ○ | ○ | ○ |
| 9 | x | x | x | ○ | ○ | ○ | ○ | ○ |
| 10 | ○ | ○ | ○ | ○ | ○ | Δ | ○ | x |
| 11 | ○ | ○ | x | ○ | ○ | ○ | ○ | ○ |

○: good, Δ: relatively good, x: poor.

Experiment Process
1) Cleaning the surface of the substrate with ethyl alcohol.
2) Adding ethanol, polyacrylic resin, silane coupler, HCl, ECC4000 sequentially, and stirring for 1-3 h.
3) Allowing the mixture to stand for aging for 1 day, and then the mixture is in clear state.
4) Applying the sample on the substrate, and placing the substrate into an oven to stand for 2-24 h at 30-40° C. Under the condition of 80° C., it takes 15-20 mins to be cured into a film.

Test Example 1

Appearance of Coating Modification

There were two crucial factors closely related to the final appearance of coating: the leveling property of sample and the transparency of coating after curing.

The samples were subjected to visual measurement for the leveling property, the color and transparency of the coating after curing, and the evaluation results for each example were shown in Table 3.

Evaluation Method:
1. Leveling property
   Good: The sample has good spreadability on the surface of the substrate, no sagging, no shrinkage cavity, represented by "○".
   Relatively good: The sample has good spreadability on the surface of the substrate, no obvious sagging, a small amount of shrinkage cavity, represented by "Δ".
   Poor: The sample has poor spreadability on the surface of the substrate, obvious sagging, severe shrinkage cavity, represented by "x".
2. Transparency
   Good: The cured coating exhibits transparency as colorless glass, no hazing or blanching phenomena, represented by "○".
   Relatively good: The cured coating exhibits transparency as colorless glass, minor hazing and blanching phenomena, represented by "Δ".
   Poor: The cured coating is matte and opaque, represented by "x".
3. Appearance
   Good: The cured coating is flat, smooth, no shrinkage cavity, no blanching phenomena, represented by "○".
   Relatively good: The cured coating is flat, smooth, a small amount of shrinkage cavity, minor blanching phenomena, represented by "Δ".
   Poor: The cured coating is not flat, rough, opaque, shrinkage cavity, represented by "x".

The property test results of some examples are illustrated as follows by referring to the drawings.

Figure 1:
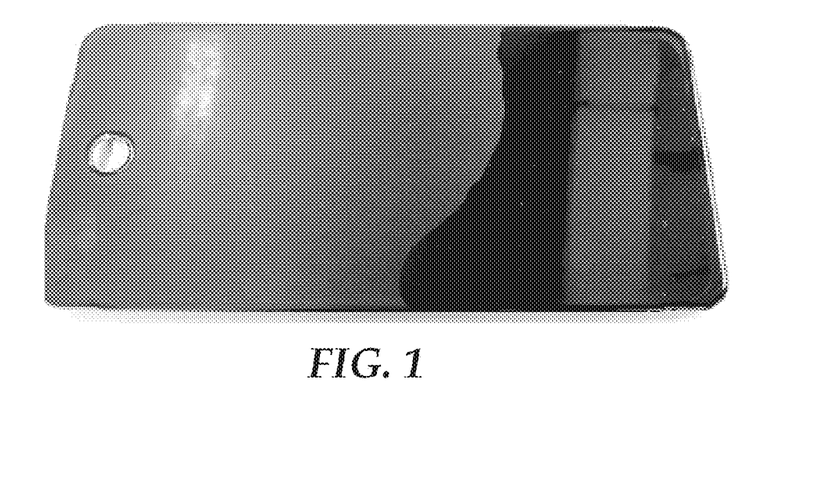
FIG. 1 is the appearance comparison between the coated paint surface with the coating formed from the coating composition according to the present diclosure and the uncoated paint surface.

FIG. 1 is the appearance comparison between the coated paint surface with the coating formed from the coating composition of one example (Example 1b) of the coating composition and the uncoated paint surface. The appearance of the paint metal plates before and after coating, wherein the plate on the left is the paint metal plate before coating, and the plate on the right is the paint metal plate after coating. It can be seen from the FIG. 1 that the coating can increase the depth of the color of the paint surface, and make the paint surface seem more black and shining.

Figure 2:
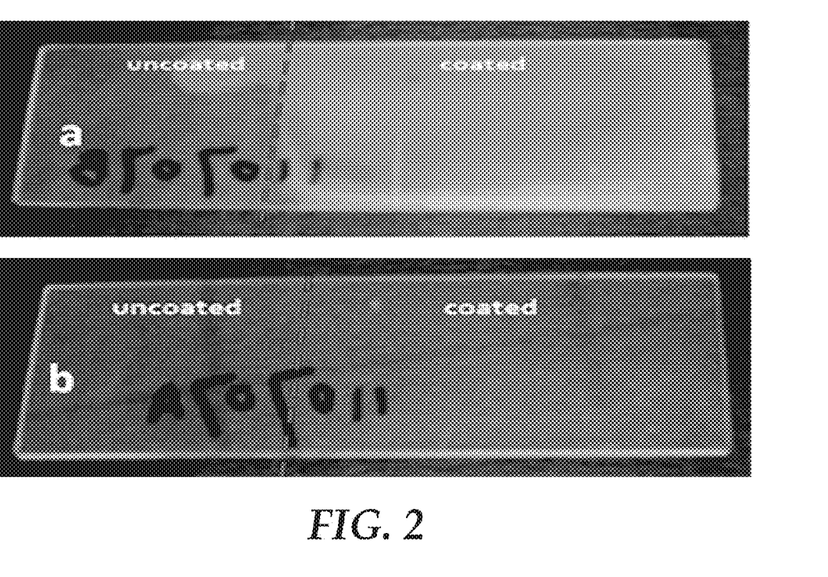
FIG. 2 is the transparency comparison between the glass plate coated with the coating according to the present disclosure containing the silane coupler and the glass plate coated with the coating without the silane coupler.

One feature of the coating composition is that the addition of silane coupler, especially KH560, largely improves the transparency of the coating. As for the glass substrates shown in FIG. 2, the glass plate (a) shown the coating coated with the composition without silane coupler (Example 11) was white and opaque. The glass plate (b) shown that the coating with coated with composition containing silane coupler (Example 1b) was highly transparent. The reason might be as follows: the addition of silane coupler modified the compatibility between the polyacrylic resin and fluorosiloxane (for example, ECC4000).

Test Example 2

Contact Angle

Contact angle analyser DSA100E was used to measure the contact angle of each sample. The measuring results for each example were shown in Table 3.

Figure 3:
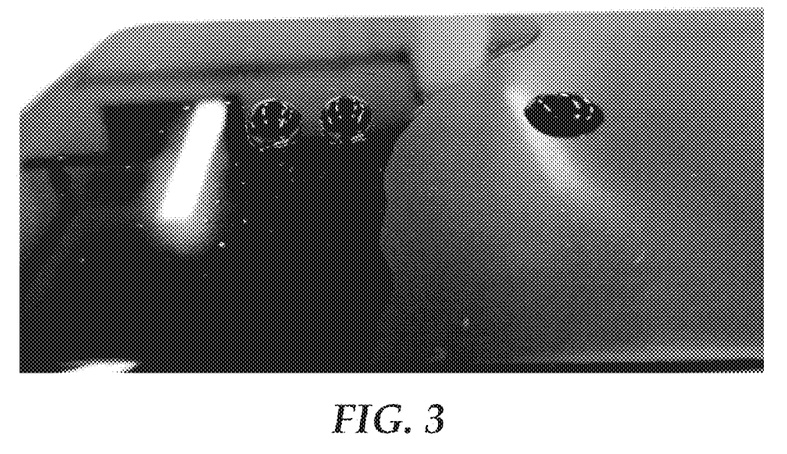
FIG. 3 shows the standing conditions of water droplets on the coated substrate surface with coating according to the disclosure and uncoated substrate surface.
Figure 4:
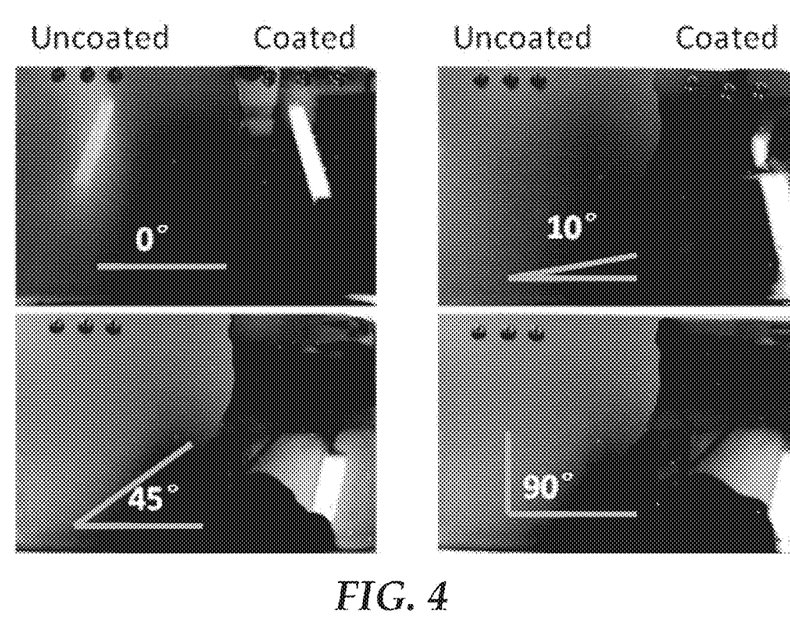
FIG. 4 is the schematic figure showing the roll-off angle measuring process for one example sample of the coating composition.

FIG. 3 shows the hydrophobicity and oleophobicity testing results for the coating of one example (Example 1b) of the invention.

As shown in FIG. 3, the shapes of water droplets are different in standing conditions on the paint surface and on glass. The water droplet on the right side of the substrate had a bead-like shape having a contact angle of 115°-120° due to the presence of coating, demonstrating good hydrophobic property. However, the shape of water droplets on the left had a large contact surface with the blank substrate, having a contact angle of 45-60°, demonstrating poor hydrophobic property.

Test Example 3

Roll-Off Angle

Besides the contact angle, the roll-off angle is another important indicator of the hydrophobicity. Roll-off angle is that for the water droplets added on the surface of the substrate to begin to roll off when the substrate is inclined. The measuring results for each example were shown in Table 3.

Figure 6:
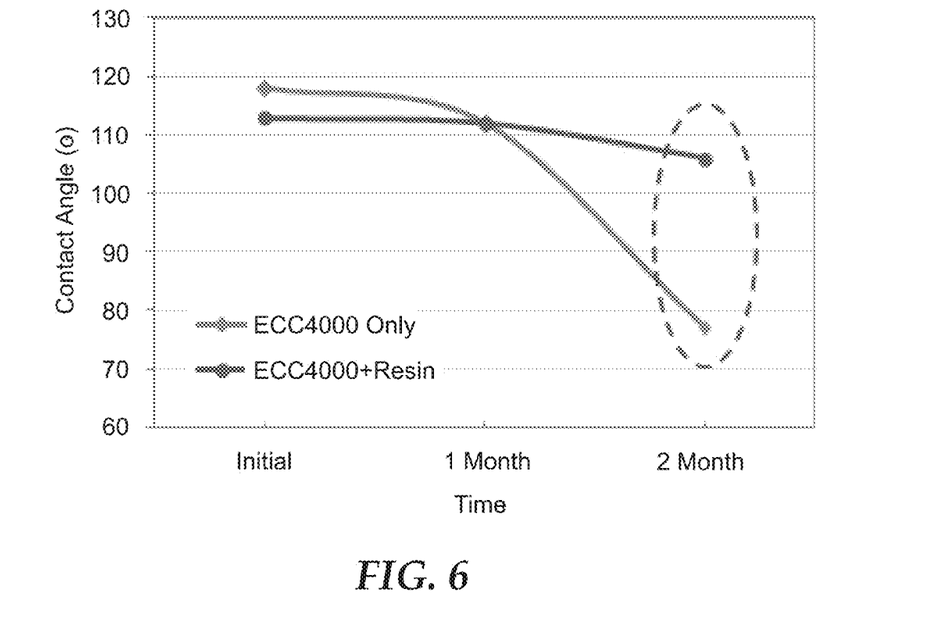
FIG. 6 shows the durable hydrophobicity results for the coatings containing the polyacrylic resin and not.

FIG. 6 is the schematic figure showing the roll-off angle measuring process and results for one example (Example 1b) of the coating composition. Water droplets with different weights were added on the two parts of the substrate coated (right side) with the coating composition of the invention and uncoated (left side), then the paint substrate is gradually inclined from the horizontal state. The water droplets on the right half coated side would roll off immediately as soon as the substrate was sloped by 10 degrees. However, it was not until 45 degrees that the first droplet on the left uncoated part begun to slide off when all of drops on the right part have rolled off. Even the substrate was erected by 90 degrees, there were still droplets left on the uncoated part. This demonstration indicated that the coating formed by the coating composition according to the present disclosure has excellent hydrophobic property.

Test Example 4

Oleophobic Property

Figure 5:
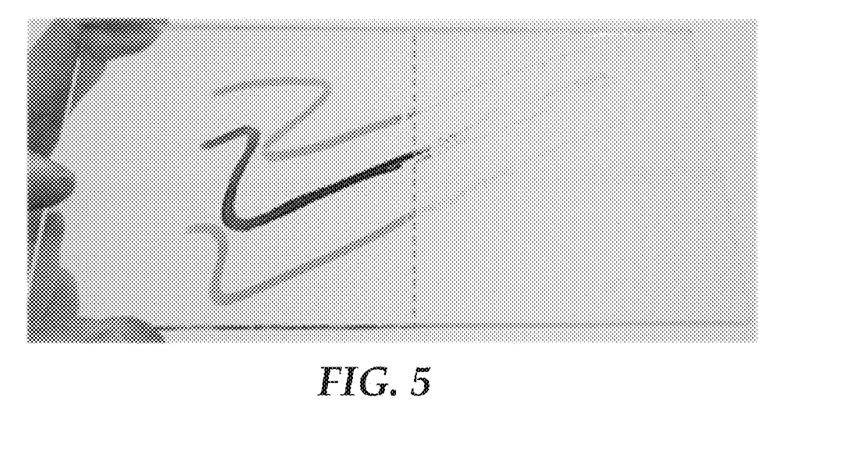
FIG. 5 is a figure showing the hydrophobicity measuring results for one example sample of the coating composition.

The oleophobic property is measured by making a sign on the coated glass plates and uncoated glass plates using oil based marker. The evaluation results for each example were shown in Table 3. Evaluation method:
  Good: with essentially no track, represented by "○".
  Relatively good: no obvious track, represented by "Δ".
  Poor: with obvious track, represented by "x".
  FIG. 5 shows the test results for one example (Example 1b) of the invention. As shown in FIG. 5, the left part is the uncoated glass plate, and the right part is coated one with the coating composition. An oil based marker is used to make any sign on the coated and uncoated glass plate. It can be seen from the figure that it was very hard for oil based maker to make a sign on the right coated part, which proved the coating indeed can deliver the olephobic benefits, while it was easy for oil based maker to make a sign on the left uncoated glass plate.

Test Example 5

Durable Hydrophobic Property

Measuring method: the coated substrate was put outdoors under natural environment such as UV, raining and dust etc, a periodic contact angle measurement is carried out.
The sample is placed outdoors for the periodic measurement. The time is recorded when the hydrophobic property is completely lost. The evaluation results for each example were shown in Table 3.
Evaluation Method:
  Good: contact angle above 100 degrees, represented by "○".

Relatively good: contact angle above 90 degrees, represented by "Δ".
  Poor: contact angle below 90 degrees, represented by "x".
  FIG. 6 shown the comparison results for the coating without acrylic resin (Example 10) and the sample with polyacrylic resin and ECC4000 (Example 1b).

As shown in FIG. 6, because ECC4000 is not UV resistant, the sample without polyacrylic resin completely loses hydrophobic property after two months. However, for the sample containing polyacrylic resin, the hydrophobic property can be maintained longer. This indicates that polyacrylic resin promotes the structural stability of ECC4000, especially improves the UV resistant capability.

Test Example 6

Antifouling Property

Figure 7:
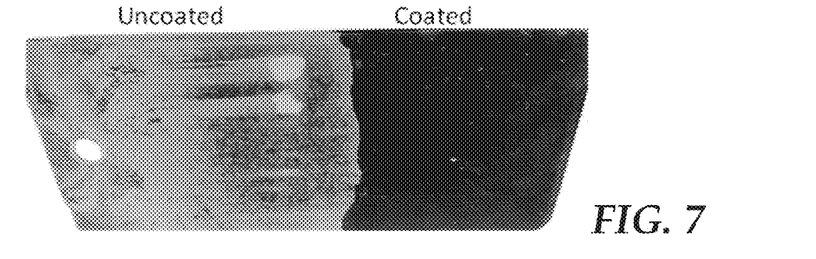
FIG. 7 shows the antifouling (dry ash) test results for one example sample of the coating composition.

The samples were placed into a sealed can with a standard soil, shaken up and down for 100 times before being taken out. After shaking off the drifting dust, the ash staining effects on the surface were observed. The evaluation results for each example were shown in Table 3.
Evaluation Method:
  Good: without obvious dirty mark, represented by "○".
  Relatively good: with a small amount of dirty marks, represented by "Δ".
  Poor: with obvious dirty mark, represented by "x".
  FIG. 7 shown the comparison results between the coated paint substrate with the coating (Example 1b) and the uncoated paint substrate
  As can be seen from FIG. 7, on the left coated substrate with the coating, the amount of the adhered ash was far below that of the right uncoated substrate. This indicated that the hydrophobic coating had obvious dry ash resistance effects.

Test Example 7

Wet Soil Antifouling Property

Figure 8A:
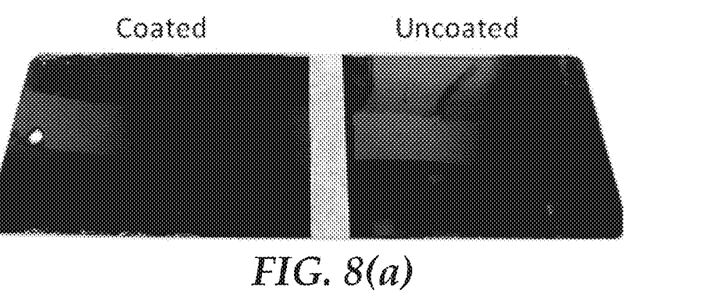
FIGS. 8(a)-8(c) show antifouling (wet ash) test results for examples of the coating composition.
Figure 8B:
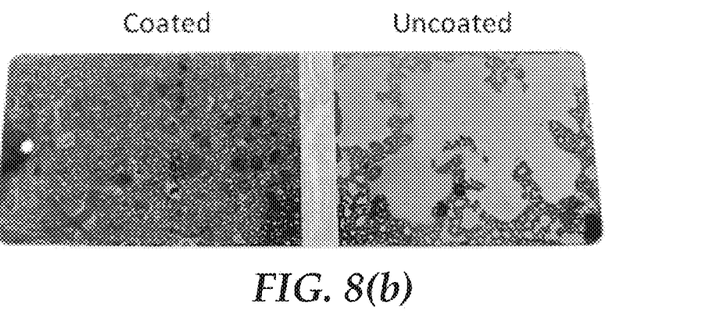
Figure 8C:
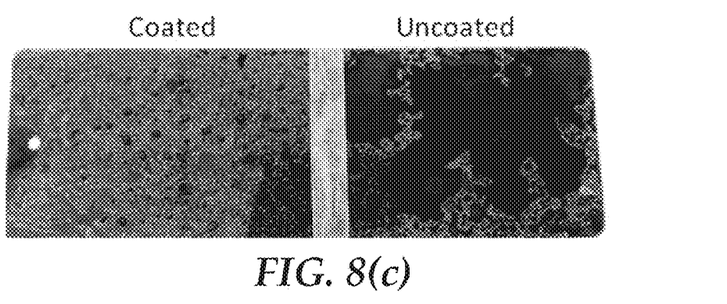

Because fouling is always a mixture of water and dust in the practical environment, we had developed a wet soil spraying method to further evaluate the antifouling property of the hydrophobic coating.
  14 g standard soil and 700 g water were mixed, and sprayed on the substrate, and the substrate was allowed to stand for 10 mins, before they were put into an oven and stored at 50° C. for 10 mins After this process was repeated 3 times, the substrate was cooled and washed with tap water. The antifouling property was evaluated based on the adhesion condition of the surface fouling after washing. The standard soil is commercial available from Gorecki Manufacture, USA. The evaluation results for each example were shown in Table 3.
Evaluation Method:
  Good: without obvious dirty mark, represented by "○".
  Relatively good: with a small amount of dirty marks, represented by "Δ".
  Poor: with obvious dirty mark, represented by "x".
  FIG. 8 shows the comparison results between the lacquer plates with and without the coating.
  As shown in FIG. 8(a), before spraying, the coating on the left was obviously blacker and brighter than the one on the right. After 3 turns of wet soil spraying, the soil adhesion amount of the uncoated substrate was obviously higher than that of the coated substrate, as shown in FIG. 8(b). Even after washing with clean water for the same time period, the uncoated substrate still had more soil deposition, as shown in FIG. 8 (c). Overall, the coating had very good antifouling property.

Test Example 8

Abrasion Resistance

Wet abrasion test was carried out on REF903 (friction machine). After friction, the changes on the water-repelling angle were measured. The evaluation results for each example were shown in Table 3.

As the number of abrasion times increases, the water-repelling angle of the coating exhibits slow increasing trend. After 5000 times of friction, the coating formed from the coating composition had a water-repelling angle decreased to 100 degrees. Compared to the uncoated substrate, it still retained certain hydrophobic effects.

The hydrophobic and oleophobic coating composition used perfluoro polyether siloxane, polyacrylic resin, silane coupler, organic solvent, and acid catalyst. The combination of polyacrylic resin and perfluoro polyether siloxane which performances hydrophobic property, not only ensures good hydrophobic property, but also ensures long lasting hydrophobic property of the coating with the help of good adhesion of polyacrylic resin. The coating composition can form hard coating with high glossiness and high transparency under relatively low temperatures, having a contact angle of 115-120°, exhibiting good hydrophobic property and abrasion resistance. The coating composition can be used on surfaces of substrates, such as automotive paints, metals, plastics and glass, and it can retain long lasting hydrophobic and oleophobic property even placed outdoors for several months, and it can also prevent the surface of the substrate from being scratched.

What is claimed is:

1. A coating composition, which comprises the following components based on weight percentage:
   0.1-15% of a fluorosilane,
   1-30% of a polyacrylic resin,
   0.1-15% of a silane coupler,
   0.05-15% of an acid,
   33-98% of an organic solvent;
   wherein the polyacrylic resin is in the form of hydroxy modified polyacrylic resin emulsion.

2. The coating composition according to claim 1, characterized in that the fluorosilane is represented by the formula (I):

$$CF_3(CF_2)_a(CH_2)_b—Si(OCH_2CH_3)_3 \quad (I)$$

wherein, a is 3-10, and b is 1-7.

3. The coating composition according to claim 1, characterized in that the fluorosilane is perfluoro polyether siloxane.

4. The coating composition according to claim 3, characterized in that the fluorosilane is perfluoro polyether siloxane represented by formula (II):

$$(C_2H_5O)_3Si(C)_3N(H(C(O)—R_f—C)N(H)(CH_2)_3Si(OC_2H_5)_3 \quad (II)$$

wherein $R_f$ is  $CF_2O(CF_2CF_2O)_n(CF_2O)_mCF_2$, n and m are independently 1-20.

5. The coating composition according to claim 4, characterized in that n and m are independently 9-10.

6. The coating composition according to claim 1, characterized in that the silane coupler is at least one selected from the group consisting of the following compounds:

and $CH_2=C(CH_3)COOC_3H_6Si(OCH_3)$.

7. The coating composition according to claim 6, characterized in that the silane coupler is:

8. A coating composition, which comprises the following components based on weight percentage:
   0.1-15% of a fluorosilane,
   1-30% of a polyacrylic resin,
   0.1-15% of a silane coupler,
   0.05-15% of an acid,
   33-98% of an organic solvent;
   wherein the organic solvent is at least one selected from the group consisting of acetone and methyl ethyl ketone.

9. The coating composition according to claim 1, characterized in that the acid is at least one selected from of the group consisting of hydrochloric acid, sulfuric acid, acetic acid, citric acid and lactic acid.

10. A method for preparing the coating composition according to claim 1, comprising the following steps:
    a) mixing the organic solvent, the polyacrylic resin, the silane coupler and the fluorosiloxane to yield a clear mixture;
    b) adding the acid into the mixture, and stirring it until the mixture being clear; and
    c) allowing the mixture obtained in step b) to stand for aging.

11. The method according to claim 10, characterized in that in step b) the mixture is stirred for 1-3 hrs.

12. The method according to claim 10, characterized in that in step c) the mixture is aged for at least 1 day.

13. A method for preparing the coating composition according to claim 1, comprising: mixing the fluorosiloxane and acid to obtain a first mixture, and mixing the organic solvent, the polyacrylic resin and the silane coupler to obtain a second mixture, and then mixing the first mixture and the second mixture, followed by stirring and aging.

14. The method according to claim 13, characterized in that the stirring takes 1-3 hrs.

15. The method according to claim 13 or 14, characterized in that the aging takes at least 1 day.

* * * * *